(12) United States Patent
Wu

(10) Patent No.: US 9,052,578 B2
(45) Date of Patent: *Jun. 9, 2015

(54) LASER PROJECTION DEVICE

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 3 days.

This patent is subject to a terminal disclaimer.

(21) Appl. No.: 13/893,354

(22) Filed: May 14, 2013

(65) Prior Publication Data

US 2014/0168612 A1 Jun. 19, 2014

(30) Foreign Application Priority Data

Dec. 13, 2012 (TW) .............................. 101147263 A

(51) Int. Cl.
*G03B 21/14* (2006.01)
*G03B 21/20* (2006.01)

(52) U.S. Cl.
CPC .......... *G03B 21/142* (2013.01); *G03B 21/2033* (2013.01); *G03B 21/14* (2013.01); *G03B 21/208* (2013.01)

(58) Field of Classification Search
CPC ..... G03B 21/14; G03B 21/20; G03B 21/2033

USPC ............ 353/30, 31, 38, 85, 94; 359/446, 455, 359/626, 718, 719; 349/5, 7–9
See application file for complete search history.

(56) References Cited

U.S. PATENT DOCUMENTS

| 6,331,878 | B1 * | 12/2001 | Takahara ........................ 349/5 |
| 7,303,291 | B2 * | 12/2007 | Ikeda et al. ................... 353/102 |
| 8,454,169 | B2 * | 6/2013 | Kaseya ........................... 353/38 |
| 8,702,240 | B2 * | 4/2014 | Kawasumi ...................... 353/31 |
| 2004/0061839 | A1 * | 4/2004 | Kim et al. ....................... 353/94 |
| 2006/0038145 | A1 * | 2/2006 | Itou ............................... 250/566 |
| 2007/0195278 | A1 * | 8/2007 | Yokote et al. ................... 353/34 |
| 2010/0283975 | A1 * | 11/2010 | Hsiung et al. ................... 353/33 |

* cited by examiner

*Primary Examiner* — Sultan Chowdhury
(74) *Attorney, Agent, or Firm* — Novak Druce Connolly Bove + Quigg LLP

(57) ABSTRACT

A laser projection device includes three laser chips, a spectroscope arranged on light paths of laser beams emitted from the three laser chips, and a lens mounted between the laser chips and the spectroscope. The lens includes a main body and a bending part bent from the main body. The main body is on the light paths of two of the laser chips. The bending part is on the light path of another laser chip. The laser beams emitted from the corresponding two laser chips are refracted by the main part of the lens. The laser beams emitted from the corresponding another laser chip are refracted by the bending part. The laser beams emitted from the laser chips are converged by the lens to reach the spectroscope and then reflected by the spectroscope to be mixed together.

18 Claims, 3 Drawing Sheets

LASER PROJECTION DEVICE

BACKGROUND

1. Technical Field

The disclosure generally relates to projection devices and more particularly to a laser projection device.

2. Description of Related Art

Laser projection devices are more and more popular for its projected images having a lager color gamut, a higher brightness, an increased contrast and a better saturation.

A conventional laser projection device includes a red light emitting diode (LED) package, a green LED package, a blue LED package, a spectroscope arranged on light paths of the LED packages and a photoelectric conversion device. Light emitted from the LED packages directly radiates to the spectroscope and then is reflected by the spectroscope to mix. And then, the mixed light can be modulated into images on a screen by the photoelectric conversion device. However, light emitted from the LED packages directly radiating into the spectroscope easily results in a light interference, which may seriously affected the performance of the laser projection device.

What is needed, therefore, is an improved laser projection device which can overcome the above described shortcomings.

DETAILED DESCRIPTION

Embodiments of laser projection device will now be described in detail below and with reference to the drawings.

Figure 1:
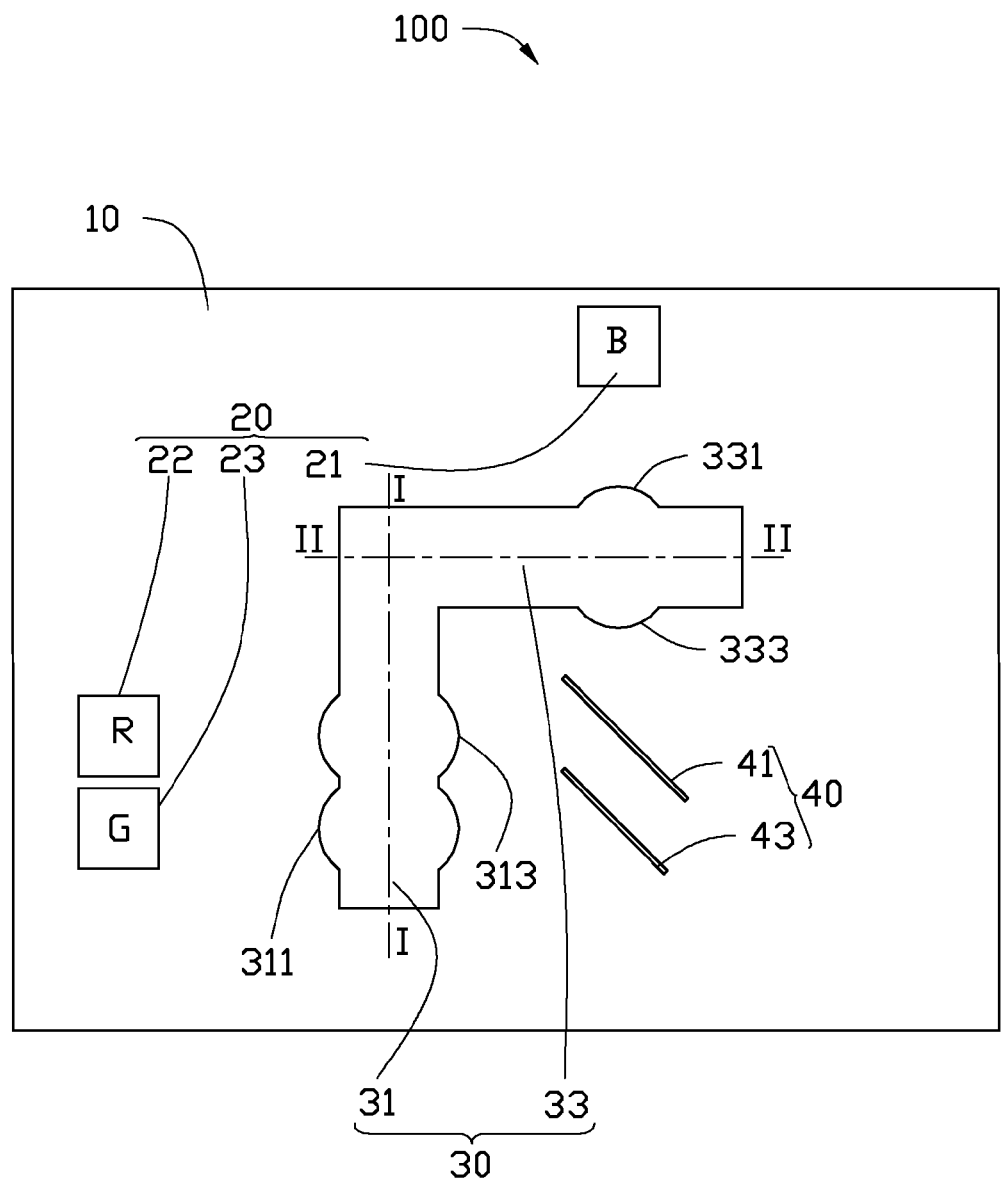
FIG. 1 is a top view of a laser projection device according to a first embodiment of the present disclosure.

Referring to FIG. 1, a laser projection device 100 according to a first embodiment of the present disclosure includes a substrate 10, a light source 20, a lens 30 and a spectroscope 40. The light source 20, the lens 30 and the spectroscope 40 are mounted on the substrate 10. The spectroscope 40 is arranged on light paths of lights emitted from the light source 20. The lens 30 is located between the light source 20 and the spectroscope 40.

The substrate 10 is flat. The light source 20, the lens 30 and the spectroscope 40 are arranged on a top surface of the substrate 10. A circuit (not shown) is arranged on the top surface of the substrate 10. In this embodiment, the substrate 10 is made of electrically insulating material, such as silicone or epoxy.

The light source 20 includes a plurality of laser chips. The laser chips are spaced from each other, and are electrically connected to the circuit on the top surface of the substrate 10. A brightness of the laser chips can be controlled by a current flowing through the circuit. The light source 20 is used to emit laser beams with colors needed.

The light source 20 includes a blue laser chip (B) 21, a red laser chip (R) 22 and a green laser chip (G) 23. Each laser chip 21, 22, 23 is a laser diode. The blue laser chip (B) 21, the red laser chip (R) 22, and the green laser chip (G) 23 are spaced from each other. In this embodiment, the red laser chip (R) 22 and the green laser chip (G) 23 are separated, and are arranged in a line along a transverse direction of the substrate 10, the blue laser chip (B) 21 is located at a right side of the red laser chip (R) 22. Alternatively, the arranged position of the laser chips 21, 22, 23 can be exchanged.

The lens 30 is spaced from the light source 20, and located on the light paths of the light source 20. The lens 30 is made of materials with a consistent refractive index. The lens 30 is used to refract laser beams emitted from the light source 20 convergently into the spectroscope 40.

The lens 30 is L-shaped, and includes a main body 31 and a bending part 33 bent rightward from a top end of the main body 31. The main body 31 and the bending part 33 are cuboid. A longitudinal direction of the main body 31 is parallel to the transverse direction of the substrate 10, and a longitudinal direction of the bending part 33 is parallel to a longitudinal direction of the substrate 10. That is, a longitudinal direction of the main body 31 is perpendicular to that of the bending part 33.

In this embodiment, the main body 31 is located at a right side and on light paths of the red laser chip (R) 22 and the green laser chip (G) 23. The bending part 33 is located at a bottom side of the blue laser chip (B) 21, and on light paths of the blue laser chip (B) 21. The bending part 33 is above the laser chips 22, 23 and located at a right side of the laser chips 22, 23.

A pair of first light concentrating parts 311 is integrally formed on the main body 31, and is protruding from a side surface of the main body 31 facing the laser chips (22, 23). The first light concentrating parts 311 are spaced from each other, and are aligned with the corresponding laser chips (22, 23), respectively.

Each first light concentrating part 311 is hemispherical. The first light concentrating parts 311 are used to refracted laser beams emitted from the laser chips (22, 23) corresponding with the first light concentrating parts 311. As such, an interference of the laser beams emitted from the laser chips (22, 23) is reduced. Preferably, the laser beams emitted from each of the laser chips (22, 23) are refracted by the corresponding first light concentrating parts 311 to form parallel laser beams. The first light concentrating parts 311 are not limited to the shown hemispherical shape, as long as the interference of the laser beams are reduced by the first light concentrating parts 311.

A pair of second light concentrating parts 313 is integrally formed on the main body 31, and is protruding from an opposite side surface of the main body 31 away from the side surface facing the laser chips (22, 23). The second light concentrating parts 313 are spaced from each other. The second light concentrating part 313 and the first concentrating part 311 are symmetrical relative to an I-I line along a longitudinal direction of the main body 31. The I-I line is the axial line of the main body 31 along the longitudinal direction thereof. Each second light concentrating part 313 has a same shape and a same size to a first light concentrating part 311. The second light concentrating parts 313 are used to concentrate parallel laser beams from the corresponding first light concentrating parts 311 on the spectroscope 40.

Samely, another first light concentrating part 331 is integrally formed on the bending part 33, and is protruding from a surface of the bending part 33 facing the blue laser chip (B) 21. Another second light concentrating part 333 is integrally formed on the bending part 33, and is protruding from an opposite surface of the bending part 33 facing the spectroscope 40. The second light concentrating part 333 is aligned with the first light concentrating part 331. The first light concentrating part 333 is symmetrical relative to an II-II line along a longitudinal direction of the bending part 33. The II-II line is the axial line of the bending part 33 along a longitudinal direction thereof. In this embodiment, the second light concentrating part 333 has a same shape and a same size to the second concentrating part 313; the first light concentrating part 331 has a same shape and a same size to the first light concentrating part 313.

Alternatively, each of the first light concentrating parts 311, 331 and each of the second light concentrating parts 313, 333 can be Fresnel lenses, respectively.

The spectroscope 40 includes two beam splitters 41, 43 respectively facing the laser chips (21, 22, 23) to refract the laser beams emitted from the laser chips (21, 22, 23). The beam splitters 41, 43 are aligned with, parallel to and spaced from each other. The beam splitters 41, 43 are slantwise and top ends thereof orients toward the laser chips (22, 23). An angle is defined between each of the beam splitters 41, 43 and a top end of the substrate 10. The angle is varied between 10° to 45°. The laser beams emitted from the laser chips 21, 22, 23 are refracted by the beam splitters 41, 43 to be oriented toward the same direction and mixed together to obtain a light of a predetermined color which usually is white.

Figure 2:
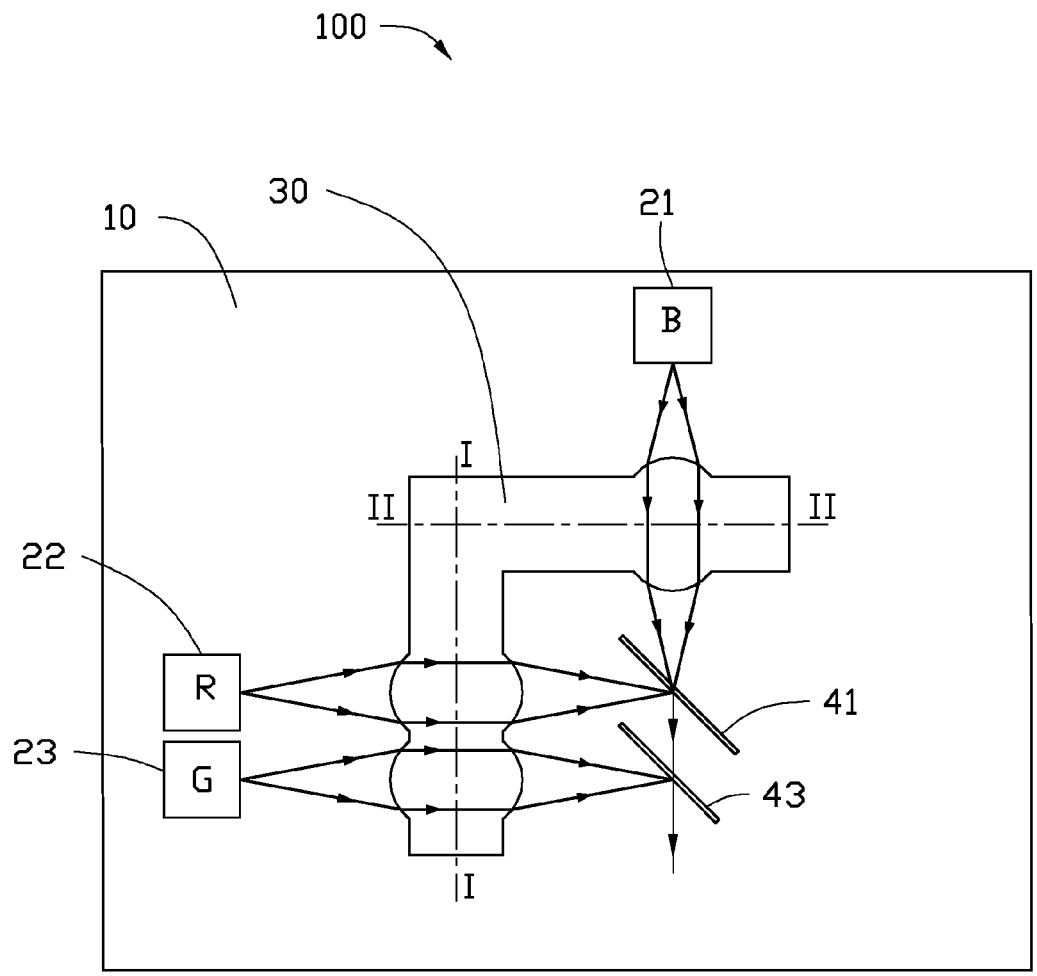
FIG. 2 is a schematic view showing light paths of the laser projection device of FIG. 1.

Referring to FIG. 2, the beam splitter 41 faces the red laser chip (R) 22, and can reflect the red laser beams and laser beams whose wavelength is near the wavelength of red laser beams, but allows laser beams with other wavelength to pass through. The beam splitter 43 faces the green laser chip (G) 23, and can reflect the green laser beams and laser beams whose wavelength is near the wavelength of green laser beams, but allows laser beams with other wavelength to pass through. The beam splitter 41 and the beam splitter 43 are aligned with the blue laser chip (B) 21, and can allow the blue laser beams to pass through.

When the laser projection device 100 works, the blue laser beams emitted from the blue laser chip 21 are refracted by the corresponding first light concentrating part 331 to become parallel blue laser beams. The parallel blue laser beams travel through the bending part 33 to the corresponding second light concentrating part 333. The blue laser beams travelled to the second light concentrating part 333 are concentrated on the beam splitter 41 by the second light concentrating part 333. And then, the concentrated blue laser beams on the beam splitter 45 passes through the beam splitter 41, 43 sequentially.

Similarly, the concentrated red laser beams on the beam splitter 41 are reflected by the beam splitter 41 to pass through the beam splitter 43. And the concentrated green laser beams on the beam splitter 43 are reflected by the beam splitter 43 to mix with the reflected blue laser beams passing through the beam splitters 41, 43 sequentially and the reflected red laser beams passing through the beam splitter 43. The mixed laser beams can be modulated into images on a screen by a photoelectric conversion device (not shown).

Figure 3:
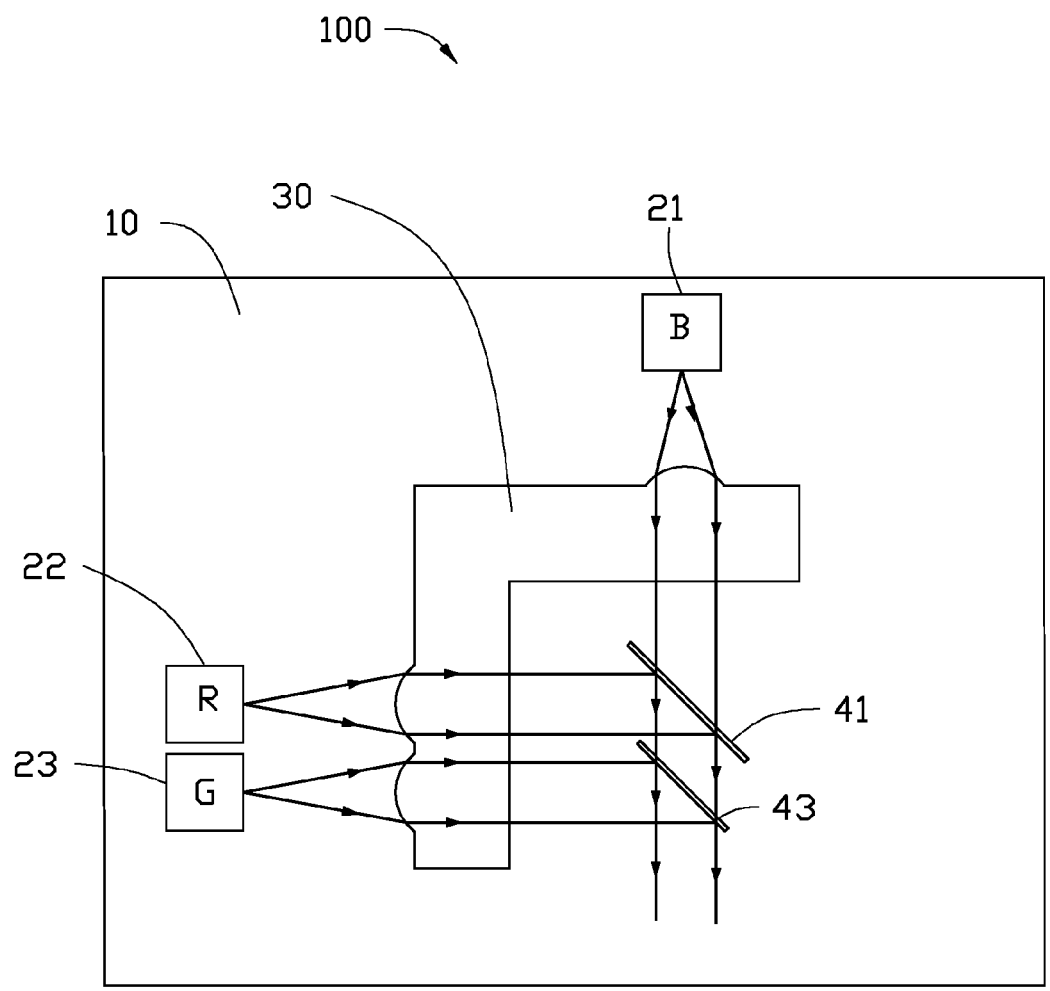
FIG. 3 is a schematic view showing light paths of a laser projection device according to a second embodiment.

Referring to FIG. 3, in a second embodiment, the difference from the first embodiment is that no second light concentrating parts 313, 333 are formed on a surface of lens 30 facing the spectroscope 40. That is, the surfaces of the main body 31 and the bending part 33 facing the spectroscope 40 are flat. As such, parallel laser beams formed by the first light concentrating parts 311, 331 directly travel through the main body 31 and the bending part 33 respectively into the beam splitters 41, 43 without a concentration by the second light concentrating parts 313, 333. As such, the parallel blue laser beams passing through the beam splitter 41, 43 sequentially, the parallel red laser beams reflected by the beam splitter 41, and the parallel green laser beams reflected by the beam splitter 43 are mixed to become a plurality of mixed parallel laser beams. The plurality of mixed parallel laser beams may be concentrated by a light concentrating lens (not shown). In this embodiment, laser beams emitted from the laser chips 21, 22, 23 are refracted by the corresponding first light concentrating part 313, 331 to become parallel laser beams, respectively. As such, an interference of the laser beams is reduced.

Firstly, according to the laser projection device 100 of this disclosure, the blue laser chip 21, the red laser chip 22 and the green laser chip 23 are directly mounted on the single substrate 10 instead of mounted on three substrates to be packaged as three individual laser LED packages; as such, a bulk of the projection laser device 100 and a cost of manufacturing the projection laser device 100 are reduced. Secondly, the lens 30 is located on light paths of the blue laser chip 21, the red laser chip 22 and the green laser chip 23. As such, the laser beams emitted from the laser chips 21, 22, 23 are refracted by the corresponding first light concentrating parts 311, 331 of the lens 30 to become parallel laser beams, which may reduce an interference of the laser beams. The parallel laser beams concentrated on the spectroscope 40 by the corresponding second light concentrating part 313, 333 make a brightness of the laser beams concentrated on the spectroscope 40 increased, which also reduces a diffusion of the laser beams. Thirdly, according to the projection laser device 100 of this disclosure, because the lens 30 is L-shaped, the laser chips (21, 22, 23) can be arranged in versatile ways. And in this invention, only two beam splitters 41, 43 are needed, whereby the bulk of the laser projection device 100 is farther reduced.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:
1. A laser projection device comprising:
a substrate;
three laser chips mounted on the substrate, each laser chip being a laser diode;
a spectroscope arranged on laser beams paths of the laser chips; and
a lens located between the laser chips and the spectroscope, the lens comprising a main body and a bending part bent from an end of the main body, the main body being located on laser beams paths of two of the three laser chips, the bending part being located on laser beams paths of another laser chip, laser beams emitted from the laser chips being refracted by the main body and the bending part convergently into the spectroscope.

2. The laser projection device of claim 1, wherein three first light concentrating parts are integrally formed on the lens, and protrude from a surface of the lens facing the laser chips.

3. The laser projection device of claim 2, wherein the first light concentrating parts are spaced from each other, and are corresponding with the laser chips, respectively.

4. The laser projection device of claim 3, wherein three second light concentrating parts are integrally formed on the lens, and protrude from a surface of the lens facing the spectroscope.

5. The laser projection device of claim 4, wherein the second light concentrating parts are spaced from each other, and are corresponding with the first light concentrating part, respectively.

6. The laser projection device of claim 5, wherein each first light concentrating part is hemispherical, and each second light concentrating part has a same size and a same shape to the first light concentrating part.

7. The laser projection device of claim 5, wherein each of the first light concentrating part and each of the second light concentrating part can be a Fresnel lens.

8. The laser projection device of claim 5, wherein the main body is cuboid, and the first light concentrating parts and the second light concentrating parts on the main body are symmetrical about an axial line of the main body along a longitudinal direction of the main body.

9. The laser projection device of claim 8, wherein the bending part is bent from a top end of the main body, and is cuboid.

10. The laser projection device of claim 9, wherein the first light concentrating part on the bending part and the second light concentrating part on the bending part are symmetrical about an axial line of the bending part along a longitudinal direction of the bending part.

11. The laser projection device of claim 5, wherein the spectroscope comprises two beam splitters corresponding with the laser chips.

12. The laser projection device of claim 11, wherein the second light concentrating parts are used to concentrate laser beams from the corresponding laser chips on the corresponding beam splitters.

13. The laser projection device of claim 12, wherein two of the laser chips are arranged in a line along a transverse direction of the substrate, and another of the laser chips is located at a side of the line.

14. The laser projection device of claim 1, wherein the laser chips comprises a red laser chip, a green laser chip and a blue laser chip.

15. The laser projection device of claim 1, wherein the lens is L-shaped.

16. A laser projection device comprising:
a substrate;
three laser chips mounted on the substrate;
a spectroscope arranged on laser beams paths of the laser chips; and
a lens located between the laser chips and the spectroscope, the lens being L-shaped; and
wherein the lens comprises a main body and a bending part bent from an end of the main body, the main body is located on light paths of two of the laser chips, and the bending part is located on light paths of another of the laser chips;
wherein the main body integrally protrudes two first light concentrating parts facing the two of the laser chips, and the bending part integrally protrudes another first light concentrating part facing the another of the laser chips.

17. The laser projection device of claim 16, wherein the main body integrally protrudes two second light concentrating parts facing the spectroscope, and the bending part integrally protrudes another second light concentrating part facing the spectroscope.

18. The laser projection device of claim 17, wherein the first light concentrating parts are aligned with the laser chips correspondingly, and each second light concentrating part is corresponding with a first light concentrating part, respectively.

* * * * *